(12) United States Patent
Gaborit et al.

(10) Patent No.: US 9,094,189 B2
(45) Date of Patent: Jul. 28, 2015

(54) CRYPTOGRAPHIC METHOD FOR COMMUNICATING CONFIDENTIAL INFORMATION

(75) Inventors: Philippe Gaborit, Feytiat (FR); Carlos Aguilar Melchor, Limoges (FR)

(73) Assignee: CENTRE NATIONAL DE LA RECHERCHE SCIENTIFIQUE-CNRS, Paris (FR)

( * ) Notice: Subject to any disclaimer, the term of this patent is extended or adjusted under 35 U.S.C. 154(b) by 319 days.

(21) Appl. No.: 13/579,682

(22) PCT Filed: Feb. 17, 2011

(86) PCT No.: PCT/FR2011/050336
§ 371 (c)(1),
(2), (4) Date: Feb. 4, 2013

(87) PCT Pub. No.: WO2011/101598
PCT Pub. Date: Aug. 25, 2011

(65) Prior Publication Data
US 2013/0132723 A1     May 23, 2013

(30) Foreign Application Priority Data

Feb. 18, 2010   (FR) ...................................... 10 51190

(51) Int. Cl.
*H04L 9/08*     (2006.01)
*G09C 1/00*     (2006.01)
*H04L 9/30*     (2006.01)

(52) U.S. Cl.
CPC .. *H04L 9/08* (2013.01); *G09C 1/00* (2013.01); *H04L 9/0841* (2013.01); *H04L 9/304* (2013.01)

(58) Field of Classification Search
CPC ..................................... H04L 9/08; G09C 1/00
See application file for complete search history.

(56) References Cited

U.S. PATENT DOCUMENTS 6,144,740 A * 11/2000 Laih et al. ........................ 380/2
7,010,738 B2 * 3/2006 Morioka et al. ............... 714/752
7,080,255 B1 * 7/2006 Kasahara et al. ............. 713/182

(Continued)

OTHER PUBLICATIONS

Regev, "On Lattices, Learning with Errors, Random Linear Codes, and Cryptography", May 24, 2005, pp. 84-93, XP002497024.

(Continued)

*Primary Examiner* — Dede Zecher
*Assistant Examiner* — Jason C Chiang
(74) *Attorney, Agent, or Firm* — Young & Thompson

(57) ABSTRACT

A cryptographic method for communicating confidential information m between a first electronic entity (A) and a second electronic entity (B), includes a distribution step and a reconciliation step, the distribution step including a plurality of steps, one of which consists of the first entity (A) and the second entity (B) calculating a first intermediate value $P_A$ and a second intermediate value $P_B$, respectively, such that: $P_A = Y_A \cdot S_B = Y_A \cdot X_B + Y_A \cdot f(Y_B)$, and $P_B = Y_B \cdot S_A = Y_B \cdot X_A + Y_B \cdot f(Y_A)$, such that, during the reconciliation step, the first entity (A) can retrieve the confidential information by a process of decrypting a noisy message composed by the second entity (B) in particular from the second intermediate value $P_B$.

21 Claims, 2 Drawing Sheets

(56) References Cited

U.S. PATENT DOCUMENTS

| | | | |
|---|---|---|---|
| 7,136,484 B1* | 11/2006 | Koh | 380/28 |
| 7,941,726 B2* | 5/2011 | Venkatesan et al. | 714/752 |
| 8,817,972 B2* | 8/2014 | Gaborit | 380/28 |
| 2002/0041681 A1* | 4/2002 | Hoffstein et al. | 380/28 |
| 2003/0012372 A1* | 1/2003 | Cheng | 380/28 |
| 2004/0151309 A1* | 8/2004 | Gentry et al. | 380/30 |
| 2005/0210248 A1* | 9/2005 | Graveman | 713/168 |
| 2006/0291661 A1* | 12/2006 | Ramzan et al. | 380/277 |
| 2007/0150794 A1* | 6/2007 | Naslund et al. | 714/781 |
| 2010/0172496 A1* | 7/2010 | Furukawa | 380/46 |

OTHER PUBLICATIONS

Diffie et al., "New Directions in Cryptography", A IEEE Transactions on Information Theory, vol. 22, No. 6, Nov. 1, 1976, pp. 644-654, XP000565260.

Kasahara, "A Construction of Public-Key Cryptosystem Using Algebraic Coding on the Basis of Superimposition and Randomness", IEICE Transactions on Fundamentals of Electronics, Communications and Computer Sciences, Engineering Sciences Society, JP, vol. E89A, No. 1, Jan. 1, 2006, pp. 47-54, XP001241425.

International Search Report dated Jun. 22, 2011, from corresponding PCT application.

\* cited by examiner

CRYPTOGRAPHIC METHOD FOR COMMUNICATING CONFIDENTIAL INFORMATION

TECHNICAL FIELD

The invention relates to the field of cryptographic communication of confidential information between a first entity A and a second entity B.

Specifically, the invention relates to the field of cryptographic communication of confidential information that can be performed on low-cost cryptographic devices having limited computing capacities, particularly smart cards or radio frequency tags.

According to a first aspect, the invention relates to a cryptographic method for communicating confidential information between a first entity and a second entity.

According to another aspect, the invention relates to a computer program comprising a plurality of instructions for using, during implementation, the method according to the invention, a cryptographic device comprising computing means designed to use the method according to the invention, as well as a data medium comprising such a cryptographic device.

PRESENTATION OF THE STATE OF THE ART AND THE TECHNICAL PROBLEM

There are two types of approaches for cryptographic coding.

A first approach that is very widespread is based on the RSA algorithm, of Rivest, Shamir and Adleman, whose security resides in the mathematical difficulty in factoring large integers.

However, such a cryptographic method exhibits several drawbacks. In particular, in the RSA algorithm, it is necessary to perform computations on public keys of great size, and particularly discrete exponential computations. Such computations can be slow, especially when they are carried out on low-cost cryptographic devices having limited computing capacities, such as on smart cards or radio frequency tags.

Among the alternatives to the cryptographic authentication methods based on the RSA algorithm, the cryptographic authentication methods are known that use a decoding of an error-correcting code from a public matrix. These methods have the advantage of being the source of NP-complete mathematical problems, therefore very difficult to solve. Therefore, these methods are very secure.

The use of error-correcting codes in cryptography has been known since the 1980s. Application EP-A-0 661 846 describes such a cryptographic authentication method that uses a decoding of error-correcting code from a public matrix. This application as well as the publication by the applicant of this application, "A New Identification Scheme Based on Syndrome Decoding," J. Stern 1993, describe an authentication protocol known as Stern syndrome protocol, that uses a very large random public matrix, typically on the order of one hundred to one thousand kilobits. Likewise, the publication "Improved Identification Schemes Based on Error-Correcting Codes," Veron, Applicable Algebra in Engineering, Communication and Computing, 1997, describes a variant of the syndrome protocol, still in the context of a cryptographic authentication method using a decoding of error-correcting code from a public matrix.

However, the storage constraints of the low-cost cryptographic devices do not allow such a protocol to be used.

Other cryptographic processes known to one skilled in the art are based on the Diffie-Hellman protocol that has served as the basis for working out numerous developments relating to modern cryptography.

This protocol was described for the first time in the publication "*New Directions in Cryptography* W. Diffie and M. E. Hellman, IEEE Transactions on Information Theory, Vol. IT-22, November 1976" and consists in that Alice and Bob share confidential information exp(ab) after having exchanged a first piece of information exp(a) and a second piece of information exp(b), such that a and b correspond to secret integers and exp( ) to an exponential function in the group G. The security of this protocol derives from the difficulty that exists in reversing the exponential function effectively and more particularly from the difficulty that exists in solving the problem exp(ab) on the basis of exp(a) and exp(b).

The Diffie-Hellman protocol is used in numerous applications but exhibits a considerable cost since the solution of exponential problems is, from an algorithmic viewpoint, one of the most complex arithmetic functions. Those who have tried to limit this cost by replacing the exponential function with other functions have encountered numerous difficulties and, moreover, have never been able to identify a solution that is both inexpensive in computations and sufficiently secure.

Also, there are known, from a different technical field, quantum cryptographic solutions that have made it possible to solve problems of exchange of confidential keys. The quantum communication protocol makes it possible for Alice to be in possession of a random variable X and for Bob to be in possession of a noise-added version Y of the random variable X.

Thus, thanks to the use of standard communication protocols, Bob can, during a reconciliation phase, separate the noise of the noise-added version Y from the random variable X and deduce from it confidential information. The confidential information is thus shared by Alice and Bob in an unconditional manner. This quantum communication protocol is therefore advantageous since it makes it possible to exchange confidential information while having the certainty that it will not be intercepted. It exhibits, however, the significant drawback of requiring the use of a quantum tunnel between Alice and Bob, which is extremely constraining from a practical viewpoint.

A need therefore exists that is not satisfied in the field of cryptography to produce a communication protocol that makes it possible to exchange confidential information without being too costly both in terms of resources and implementation, so as to be able to be integrated into low-cost cryptography devices such as smart cards or radiofrequency identification (RFID) chips, but that ensures, nevertheless, a degree of security that is sufficiently reliable and a sufficiently short response time.

SUMMARY OF THE INVENTION

The invention therefore aims at responding to these unsatisfied needs.

For this purpose, the invention has as its object a cryptographic method for communicating confidential information m between a first electronic entity (A) and a second electronic entity (B) comprising a distribution step and a reconciliation step, the distribution step comprising several steps consisting in that:

on the one hand, the first entity (A):
computes a first syndrome $S_A = X_A + f(Y_A)$ from a first secret piece of information composed of two primary elements $X_A$ and $Y_A$ belonging to a ring R and exhibiting a norm that is essentially small with regard to an element $f(X_A)$ or $f(Y_A)$, the ring R possessing the addition and the multiplication, and f being a law of internal composition that associates with any element $X_I$ of the ring R another element $f(X_I)$ of the ring R, and that possesses the property that for any pair of elements $X_I$ and $Y_I$ of R, such that $X_I$ and $Y_I$ have a small norm with regard to the elements $f(X_I)$ and $f(Y_I)$, then $X_I \cdot f(Y_I) - Y_I \cdot f(X_I)$ is of small norm, and issues a first message composed from this first syndrome $S_A$ so that said first syndrome $S_A$ is accessible by the second entity (B), on the other hand, the second entity (B):

computes a second syndrome $S_B = X_B + f(Y_B)$ from a second secret piece of information composed of two secondary elements $X_B$ and $Y_B$ belonging to the ring R and exhibiting a norm that is essentially small with regard to an element $f(X_B)$ or $f(Y_B)$, transmits to the first entity (A) a second message composed from the second syndrome $S_B$ so that said second syndrome $S_B$ is accessible by the first entity (A), in which during this first distribution step, the first entity (A) and the second entity (B) respectively calculate a first intermediate value $P_A$ and a second intermediate value $P_B$, such that:

$P_A = Y_A \cdot S_B = Y_A \cdot X_B + Y_A \cdot f(Y_B)$, and $P_B = Y_B \cdot S_A = Y_B \cdot X_A + Y_B \cdot f(Y_A)$, so that, during the reconciliation step, the first entity (A) is able to find the confidential information by an operation of deciphering a noise-added message composed by the second entity (B) from, in particular, the second intermediate value $P_B$.

According to an embodiment, the first message issued by the first entity (A) is transmitted directly with a destination of the second entity (B).

According to an embodiment, the noise-added message composed by the second entity (B) during the reconciliation phase comprises a data item C obtained from, in particular, the second intermediate value $P_B$ and the confidential information m.

According to an embodiment, the first entity (A) decodes the confidential information m from, in particular, the noise-added message and the first intermediate value $P_A$.

According to an embodiment, the confidential information m is encoded in the data item C of the noise-added message, by an error-correcting code.

According to an embodiment, the data item C of the noise-added message is such that $C = m \cdot G + P_B + e$, with:

m which represents the confidential information,

G which represents the generator matrix for an error-correcting code on which the first entity A and the second entity B have previously publicly agreed, and e which represents a vector of random errors of length n and of small norm, the first entity A and the second entity B having previously publicly agreed on the length n.

According to an embodiment, the data item C of the noise-added message is such that $C = m \cdot G + v[P_B]$, with:

m which represents the confidential information,

G which represents the generator matrix for an error-correcting code on which the first entity A and the second entity B have previously publicly agreed, and v[ ] which represents an operation consisting in extracting p coordinates from the n coordinates of a vector, the first entity A and the second entity B having previously agreed on the value of p.

According to an embodiment, the data item C of the noise-added message is such that $C = m \cdot G + v[P_B] + e$, with:

m which represents the confidential information,

G which represents the generator matrix for an error-correcting code on which the first entity A and the second entity B have previously publicly agreed, v[ ] which represents an operation consisting in extracting p coordinates from the n coordinates of a vector, the first entity A and the second entity B having previously agreed on the value of p, e which represents a vector of random errors of length n and of small norm, the first entity A and the second entity B having previously publicly agreed on the length n.

According to an embodiment, the first entity (A) composes an encryption key either from the confidential information m, or from the second intermediate value $P_B$, or from a combination of the confidential information and the second intermediate value $P_B$.

According to an embodiment, after having issued the first message composed from the first syndrome $S_A$, the first entity (A) makes this first message available to the second entity (B) in a public space that is accessible to at least one other electronic entity.

According to an embodiment, after having calculated the second syndrome $S_B$, the second entity (B) transmits to the first entity (A):

the second message composed from the second syndrome $S_B$, and the noise-added message composed from a data item C obtained from the second intermediate value $P_B$ and the confidential information m.

According to an embodiment, the first entity A decodes the confidential information from the second message and from the noise-added message.

According to an embodiment, the first entity A decodes the confidential information m from the second syndrome $S_B$ that composes the second message, from the second intermediate value $P_B$ that composes the noise-added message, and from the first intermediate value $P_A$.

According to an embodiment, the confidential information m is encoded in the data item C of the noise-added message, by an error-correcting code.

According to an embodiment, the data item C of the noise-added message is such that $C = m \cdot G + P_B + e$, with:

m which represents the confidential information,

G which represents the generator matrix for an error-correcting code on which the first entity A and the second entity B have previously publicly agreed, and e which represents a vector of random errors of length n and of small norm, the first entity A and the second entity B having previously publicly agreed on the length n.

According to an embodiment, the data item C of the noise-added message is such that $C = m \cdot G + v[P_B]$, with:

m which represents the confidential information,

G which represents the generator matrix for an error-correcting code on which the first entity A and the second entity B have previously publicly agreed, and v[ ] which represents an operation consisting in extracting p coordinates from the n coordinates of a vector, the first entity A and the second entity B having previously agreed on the value of p.

According to an embodiment, the data item C of the noise-added message is such that $$C = m \cdot G + v[P_B] + e, \text{ with:}$$

m which represents the confidential information,

G which represents the generator matrix for an error-correcting code on which the first entity A and the second entity B have previously publicly agreed, v[ ] which represents an operation consisting in extracting p coordinates from the n coordinates of a vector, the first entity A and the second entity B having previously agreed on the value of p, e which represents a vector of random errors of length n and of small norm, the first entity A and the second entity B having previously publicly agreed on the length n.

According to an embodiment, the first entity (A) composes an authentication message either from the confidential information m, or from the second intermediate value $P_B$, or from a combination of the confidential information m and of the second intermediate value $P_B$.

According to an embodiment, the ring R is the ring $F_q[x]/(X^n-1)$, i.e., the set of polynomials with coefficients in the field $F_q$ with q elements for which the remainder (or residue) is considered by the division of the polynomial $(X^n-1)$.

According to an embodiment, the norm corresponds to the Hamming distance.

According to an embodiment:

n is approximately equal to 6000, and $X_A, X_B, Y_A, Y_B$ exhibit a norm equal to 35-so that the norm of $P_A$-$P_B$ is approximately equal to 2400.

According to an embodiment, the ring R is the ring Z/pZ, i.e., the set of the modulo integers p minus the remainder of the division by p.

According to an embodiment, the norm is a Euclidean norm.

According to an embodiment:

p is approximately equal to 2500, $f(x) = h \cdot x$ modulo p with h a random number smaller than p, and/or $X_A, X_B, Y_A, Y_B$ are R elements of smaller norm than root (p).

According to another aspect, the invention relates to a computer program comprising a plurality of instructions for using, during implementation, the method according to any one of the embodiments 1 to 24.

According to another aspect, the invention relates to a cryptographic device comprising computing means designed to use the method according to any one of the embodiments 1 to 24.

According to another aspect, the invention relates to a data medium comprising a cryptographic device according to the invention.

DESCRIPTION OF THE FIGURES

Detailed examples of embodiment of the invention are described, below, with reference to the accompanying figures, in which.

Figure 1:
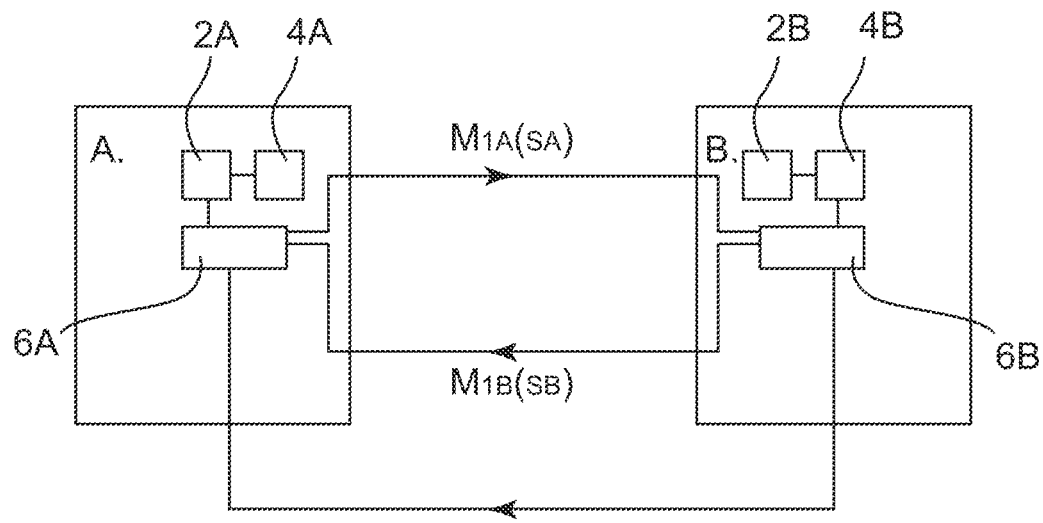
FIG. 1 is a diagrammatic representation of a first embodiment of the cryptographic method according to the invention by which a first entity and a second entity exchange an encryption key.

To begin with, it is well to stress that within the scope of the invention, the term "message" corresponds to any type of signal or block of information carried through a physical medium or through radio-frequency waves. These messages are, for example, formed by a data frame consisting of a series of "0's" and "1's" that characterize at least one piece of information that can be deduced from a suitable operation.

On the other hand, an R "ring" can be defined as any algebraic structure on which two operations satisfy certain properties of addition and multiplication. In view of this, the invention proposes using, as algebraic structure, a ring (R, +, x) that is known publicly rather than a set such as the traditional protocol of Diffie-Hellman used.

Furthermore, a "norm," or distance, is an application on the ring R with positive real values and that satisfies the following hypotheses: separation, homogeneity, subadditivity and sub multiplicative.

A first embodiment of the method according to the invention is described with reference to FIG. 1.

According to this first embodiment, the cryptographic method according to the invention is used to perform an exchange of encryption key that makes it possible for a first electronic entity A, named Alice, and a second electronic entity B, named Bob, to exchange enciphered confidential information. To make it possible for her to issue, receive and store data, Alice comprises a processor 2A, a storage space 4A and a communication unit 6A. Similarly, Bob also comprises a processor 2B, a storage space 4B and a communication unit 6B.

A first step of the method corresponds to a so-called distribution step.

According to this first step, Alice and Bob exchange data so as to reach an agreement on a ring R, an integer n and an element h of the ring R. The element h is selected randomly and can be considered as an equivalent of the generator used within the framework of the power elevation step of the Diffie-Hellman protocol.

According to an example of embodiment, the ring R selected corresponds to $F_2[x]/(X^n-1)$, i.e., the set of polynomials with coefficients in the field $F_2$ with two elements for which the remainder is considered by the division of the polynomial $(X^n-1)$. The Hamming distance is then used as norm function.

It is well to stress that, alternatively, it would also be possible to select other pairs of ring R and norm, including:

the ring Z/pZ and the Euclidean norm;

the ring $(Z/pZ)[x]/(x^n-1)$ and the Euclidean norm also; and the ring $(Z/p^rZ)[X]/(x^n-1)$ and for norm—the metric rank.

In this embodiment, it is possible to use a double circulating binary code C [2n, n] comprising a matrix for verifying parity of the form $[I_n|H]$ where $I_n$ is the identity matrix of size n×n, and h is such that:

$$H = \begin{bmatrix} h_0 & h_{n-1} & \ldots & h_1 \\ h_1 & h_0 & \ldots & h_2 \\ h_2 & h_1 & \ldots & h_3 \\ \ldots & \ldots & \ldots & \ldots \\ h_{n-1} & h_{n-2} & \ldots & h_0 \end{bmatrix}$$

After having selected the ring R, the generator h and the integer n, Alice and Bob select separately and secretly a pair of primary elements $X_A, Y_A$ for Alice and $X_B, Y_B$ for Bob so that these primary elements $X_A, Y_A, X_B$ and $Y_B$ are of small norm, and therefore exhibit a small Hamming distance, in relation to a positive real number w. For example, for a ring R: $F2[x]/(x^n-1)$ this small Hamming distance can be on the order of square_root(n)/10.

Alternatively, for an embodiment where the ring R selected would be Z/pZ, an example of small norm that corresponds to the small distance min(x, p−x) would be square_root (p)/100.

Alice and Bob then calculate respectively the syndromes $S_A$ and $S_B$ from a function f such that: $S_A=f(X_A,Y_A)=X_A \cdot h Y_A$ and $S_B=f(X_B, Y_B)=X_B \cdot h+Y_B$, where f is a law of internal composition associating with any element $X_I$ of the ring R another element $f(X_I)$ of the ring R and possessing the property that for any pair of elements $X_I$ and $Y_I$ of R, such that $X_I$ and $Y_I$ have a small norm with regard to the elements $f(X_I)$ and $f(Y_I)$, then $X_I \cdot f(Y_I) - Y_I \cdot f(X_I)$ is of small norm.

Alice transmits to Bob a first message $M_{1A}(S_A)$ composed in particular from the first syndrome $S_A$ so that said first syndrome $S_A$ can be recovered by Bob. Concurrently, Bob transmits to Alice a second message $M_{1B}(S_B)$ composed in particular from the second syndrome $S_B$ so that said second syndrome $S_B$ can be recovered by Alice.

Alice then calculates a first intermediate value $P_A$, such that:

$$P_A = Y_A \cdot S_B = Y_A \cdot X_B + Y_A \cdot h \cdot Y_B.$$

And Bob in a similar fashion calculates a second intermediate value $P_B$, such that:

$$P_B = Y_B \cdot S_A = Y_B \cdot X_A + Y_B \cdot h \cdot Y_A.$$

Consequently, Alice and Bob are respectively in possession of a first intermediate value $P_A$ and a second intermediate value $P_B$ that differ from one another by the value $Y_A \cdot X_B \cdot Y_B \cdot X_A$. Now, since the primary elements $X_A, Y_A, X_B$ and $Y_B$ have been selected so that they have a small norm with regard to the parameter w, and since the Hamming distance is submultiplicative in $F_2[x]/(X^n-1)$, then the first intermediate value $P_A$ held by Alice differs from the second intermediate value $P_B$ held by Bob by a value whose norm is necessarily less than $2w^2$.

At the end of the distribution step, Alice and Bob are therefore in possession of two messages $M_{1A}(S_A)$ and $M_{1B}(S_B)$ corresponding to two fields of data, the first of which comprises the first syndrome $S_A$ and the second comprises the second syndrome $S_B$.

Then, a second so-called reconciliation step occurs.

According to a first embodiment, the reconciliation phase consists in that Alice and Bob select in a public way an operation v[ ] consisting in randomly selecting p bits from the n bits that make up the first and second intermediate values $P_A$ and $P_B$, so that sufficient probability exists that these p bits selected by Alice and Bob make it possible to deduce from them a common piece of information.

To do this, Bob transmits to Alice a noise-added message $M_{2B}(C)$ composed from a data item C that corresponds to an error-correcting code of length p that makes it possible to correct an error of a value less than or equal to $2w^2$ and such that:

$$C = m \cdot G + v[P_B]$$ where m then represents confidential information

G represents the generator matrix for an error-correcting code on which Alice and Bob have previously publicly agreed v[ ] represents a truncation operation consisting in extracting p bits from the n bits of a vector.

Because of the above construction, m·G is very noisy in relation to $v[P_B]$.

Alice can therefore calculate the value of $C-v[P_A]$ and deduce from it $m \cdot G+v[P_B-P_A]$. However, since $v[P_B-P_A]$ is relatively small, Alice is able by using the error-correcting code to correct this error $v[P_B-P_A]$ that has been added to m·G and therefore find the confidential information m as well as $v[P_B]$.

Alice can then advantageously compose an encryption key, namely from the confidential information m. Alternatively, however, it is also possible that this encryption key be composed from the second intermediate value $P_B$ or from a combination of the confidential information m and the second intermediate value $P_B$.

Several examples of parameters that can be used in the protocol according to the invention are described in the table below, in which:

the parameter n corresponds to the number of coordinates of the syndromes $S_A$ and $S_B$;

the parameter sb corresponds to the number of bits exchanged in a secure way in the method;

code is the small code C used where $BCH(255.55) \times 1_3$ corresponds to the concatenation of the binary code BCH with a distance of 55 concatenated with a repetition code of size 3;

ε is an increase of the probability that the decoding is erroneous, obtained from the rate of error induced by $2w^2/n$ and from the correction capacity of C;

security corresponds to the security of the parameter; and complexity corresponds to the binary number necessary to run the method from one side.

These parameters are selected so that $n2^{2w-r}=2^{80}$.

| n | w | sb | code C | ε | complexity | security |
| --- | --- | --- | --- | --- | --- | --- |
| 5000009 | 56 | 78 | BCH (127, 15) | $3 \cdot 10^{-3}$ | $2^{24}$ | $2^{80}$ |
| 313603 | 100 | 131 | BCH (255, 37) | $7 \cdot 10^{-3}$ | $2^{26}$ | $2^{80}$ |

It is well to note that in this first embodiment, the length of the confidential information to be decoded has been selected so that no information is lost, which limits the error-correcting code length used for the decoding.

However, according to a second embodiment, it is also possible to use the entire length of the first and second syndromes $S_A$ and $S_B$ for the decoding, by adding to it an error vector e. Thus, an attack necessarily involves the solution of a standard problem of syndrome decoding for a double circulating error-correcting code, which renders it unsolvable because of the addition of the error e.

In this case depicted, Alice and Bob publicly agree on a permutation P, a number t of random errors and an error-correcting code of generator matrix G that corrects a number of errors of length p and of size k, with a decoding algorithm able to solve a binary symmetric channel with a transition probability $(2w^2+t)/n$.

Then, Bob selects confidential information m that is encoded on a data item C that composes a noise-added message $M_{2B}(C)$ such that:

$C=m \cdot G+P[P_B]+e$, where

G represents the generator matrix for the error-correcting code, e represents the vector of t random errors of length m and of size k, and $P[P_B]$ corresponds to the permutation P of the second intermediate value $P_B$.

From the noise-added message, Alice can therefore calculate the value $C+P[P_B]$, to apply to it the decoding algorithm of the error-correcting code and deduce from it the confidential information m, as well as the second intermediate value $P_B$.

Thus, Alice can compose an encryption key either from the confidential information m or, as before, from the second intermediate value $P_B$ or from a combination of the confidential information m and the second intermediate value $P_B$.

In the same way as before, in the table below, several examples of parameters that can be used in the protocol according to the invention are described, in which:

the parameter n corresponds to the number of coordinates of the syndromes $S_A$ and $S_B$;

the parameter sb corresponds to the number of bits exchanged in a secure way in the method;

the parameter t corresponds to the weight of the random error vector;

code is the small code C used where $BCH(255.55) \times 1_3$ corresponds to the concatenation of the binary code BCH with a distance of 55 concatenated with a repetition code of size 3;

$\epsilon$ is an increase of the probability that the decoding is erroneous, obtained from the rate of error induced by $2w^2/n$ and from the correction capacity of C;

security corresponds to the security of the parameter; and complexity corresponds to the binary number necessary to run the method from one side.

These parameters are selected so that $n2^{2w-r}=2^{80}$.

| n | w | t | sb | code C | $\epsilon$ | complexity | security |
|---|---|---|---|---|---|---|---|
| 4451 | 33 | 150 | 78 | BCH (127, 51) ⊗ $1_{35}$ | $3 \cdot 10^{-5}$ | $2^{17}$ | $2^{78}$ |
| 4877 | 33 | 150 | 131 | BCH (255, 37) ⊗ $1_{19}$ | $1 \cdot 10^{-2}$ | $2^{17}$ | $2^{78}$ |
| 4877 | 34 | 150 | 91 | BCH (255, 51) ⊗ $1_{19}$ | $2 \cdot 10^{-5}$ | $2^{17}$ | $2^{80}$ |
| 5387 | 34 | 150 | 131 | BCH (255, 37) ⊗ $1_{23}$ | $3 \cdot 10^{-5}$ | $2^{17}$ | $2^{80}$ |
| 5387 | 34 | 150 | 91 | BCH (255, 51) ⊗ $1_{23}$ | $2 \cdot 10^{-10}$ | $2^{17}$ | $2^{80}$ |
| 5869 | 34 | 150 | 131 | BCH (255, 51) ⊗ $1_{23}$ | $3 \cdot 10^{-10}$ | $2^{18}$ | $2^{80}$ |
| 7829 | 44 | 150 | 131 | BCH (255, 37) ⊗ $1_{34}$ | $4 \cdot 10^{-7}$ | $2^{19}$ | $2^{100}$ |
| 11483 | 58 | 150 | 131 | BCH (255, 37) ⊗ $1_{43}$ | $7 \cdot 10^{-7}$ | $2^{20}$ | $2^{130}$ |

It is well to stress that, according to a third embodiment, the reconciliation step can introduce a noise-added message $M_{2B}(C)$ such that the data item C comprises simultaneously a truncation operation on the second intermediate value $P_B$ and a random error vector.

Such a data item C could then exhibit the following form $C=m \cdot G+v [P_B]+e$.

Figure 2:
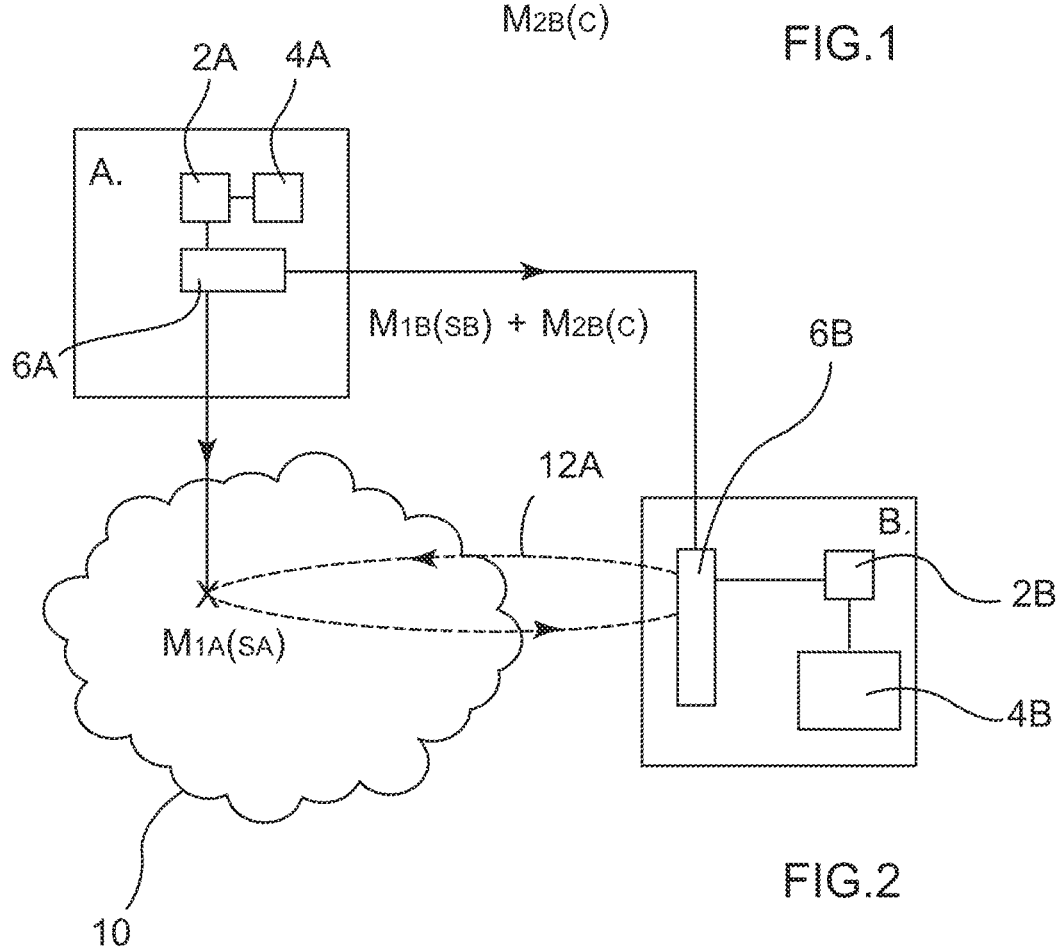
FIG. 2 is a diagrammatic representation of a second embodiment of the cryptographic method according to the invention, by which a first entity communicates an encrypted message to a second entity.

FIG. 2 shows a second embodiment of the invention.

According to this second embodiment, the communication method is used to allow Bob to send an encrypted message to the attention of Alice according to an El Gamal-type protocol.

Like before, Alice comprises a processor 2A, a storage space 4A, and a communication unit 6A, and Bob comprises a processor 2B, a storage space 4B, and a communication unit 6B.

The first step of the method corresponds to the distribution step.

As before, Alice and Bob previously exchange data so as to be in agreement on a ring R, an integer n, and an element h of the ring R.

The ring R selected corresponds, according to this example, to $F_2[x]/(X^n-1)$, i.e., the set of polynomials with coefficients in the field $F_2$ with two elements for which the remainder is considered by the division of the polynomial $(X^n-1)$. The Hamming distance is then used as norm function.

Alternatively, it would also be possible to select other pairs of ring R and norm, including:

the ring Z/pZ and the Euclidean norm;

the ring $(Z/pZ)[x]/(x^n-1)$ and the Euclidean norm also; and the ring $(Z/p^rZ)[X]/(x^n-1)$ and for norm rank metric.

In this embodiment, it is possible to use a double circulating binary code C [2n, n] comprising a matrix for verifying parity of the form $[I_n|H]$ where $I_n$ is the identity matrix of size n×n, and h is such that:

$$H = \begin{bmatrix} h_0 & h_{n-1} & \ldots & h_1 \\ h_1 & h_0 & \ldots & h_2 \\ h_2 & h_1 & \ldots & h_3 \\ \ldots & \ldots & \ldots & \ldots \\ h_{n-1} & h_{n-2} & \ldots & h_0 \end{bmatrix}$$

After having selected the ring R, the generator h and the integer n, Alice and Bob select separately and secretly a pair of primary elements $X_A, Y_A$ for Alice and $X_B, Y_B$ for Bob so that these primary elements $X_A, Y_A, X_B$ and $Y_B$ are of small norm, and exhibit therefore a small Hamming distance, in relation to a positive real number w. As before, for a ring R: F2[x]/(x^n−1), this small Hamming distance can be on the order of square_root(n)/10.

Alternatively, for an embodiment where the ring R selected would be Z/pZ, an example of small norm that corresponds to the small distance min(x, p−x) would be square_root (p)/100.

Alice and Bob then calculate respectively the syndromes $S_A$ and $S_B$ from a function f such that: $S_A=f(X_A, Y_A)=X_A \cdot h+Y_A$ and $S_B=f(X_B, Y_B)=X_B \cdot h+Y_B$, where f is a law of internal composition associating with any element $X_I$ of the ring R another element $f(X_I)$ of the ring R and possessing the property that for any pair of elements $X_I$ and $Y_I$ of R, such that $X_I$ and $Y_I$ have a small norm with regard to the elements $f(X_I)$ and $f(Y_I)$, then $X_I \cdot f(Y_I) - Y_I \cdot f(X_I)$ is of small norm.

This example of embodiment is distinguished from that of FIG. 1 in that Alice does not transmit directly to Bob the first message $M_{1A}(S_A)$ composed from the first syndrome $S_A$. On the contrary, in this second embodiment, Alice issues the first message $M_{1A}(S_A)$ and makes it available to Bob and other electronic entities in a public space 10.

Thus, Bob can recover the first message $M_{1A}(S_A)$ and deduce from it the first syndrome $S_A$ by interrogating, by request 12a, the public space 10.

Bob then calculates a second intermediate value $P_B$, such that:

$$P_B = Y_B \cdot S_A = Y_B \cdot X_A + Y_B \cdot h \cdot Y_A.$$

Thus, Bob is in a position to transmit to Alice a message comprising:
- a second message $M_{1B}(S_B)$ of length k composed from the second syndrome $S_B$, and
- a noise-added message $M_{2B}(C)$ of length k composed from a data item C obtained from the second intermediate value $P_B$ and the confidential information m.

According to a first embodiment, the data item C is such that:

$$C = m \cdot G + v[P_B], \text{ where}$$

m then represents confidential information of length k

G represents the generator matrix for an error-correcting code on which Alice and Bob have previously publicly agreed; and v[ ] represents a truncation operation consisting in extracting p bits from the n bits of a vector, Alice and Bob having previously agreed on the value of p.

Like before, Alice can then decode C from the second message $M_{1B}(S_B)$ and from the noise-added message $M_{2B}(C)$ after having calculated $P_A$ and $C+v[P_A]$. Alice then deduces from it m·G and the confidential information m.

Several examples of parameters that can be used in the protocol according to the invention are described in the table below, in which:
- the parameter n corresponds to the number of coordinates of the syndromes $S_A$ and $S_B$;
- the parameter sb corresponds to the number of bits exchanged in a secure way in the method;
- code is the small code C used where BCH(255.55)×$1_3$ corresponds to the concatenation of the binary code BCH with a distance of 55 concatenated with a repetition code of size 3;
- ϵ is an increase of the probability that the decoding is erroneous, obtained from the rate of error induced by $2w^2/n$ and from the correction capacity of C;
- security corresponds to the security of the parameter; and
- complexity corresponds to the binary number necessary to run the method from one side.

These parameters are selected so that $n2^{2w-r} = 2^{80}$.

| n | w | sb | code C | ϵ | complexity | security |
|---|---|----|--------|---|------------|----------|
| 5000009 | 56 | 78 | BCH (127, 15) | $3 \cdot 10^{-3}$ | $2^{23}$ | $2^{80}$ |
| 313603 | 100 | 131 | BCH (255, 37) | $7 \cdot 10^{-3}$ | $2^{26}$ | $2^{80}$ |

According to a second embodiment, the data item C is such that:

$$C = m \cdot G + P[P_B], \text{ where}$$

m then represents confidential information of length k

G represents the generator matrix for the error-correcting code; and $P[P_B]$ corresponds to the permutation P of the second intermediate value $P_B$.

Similarly, Alice can then decode C from the second message $M_{1B}(S_B)$ and from the noise-added message $M_{2B}(C)$ after having calculated $P_A$ and from $C+v[P_A]$ to determine m·G and deduce from it the confidential information m.

In the same way as before, several examples of parameters that can be used in the protocol according to the invention are described in the table below, in which:
- the parameter n corresponds to the number of coordinates of the syndromes $S_A$ and $S_B$;
- the parameter sb corresponds to the number of bits exchanged in a secure way in the method;
- the parameter t corresponds to the weight of the random error vector;
- code is the small code C used where BCH(255.55)×$1_3$ corresponds to the concatenation of the binary code BCH with a distance of 55 concatenated with a repetition code of size 3;
- ϵ is an increase of the probability that the decoding is erroneous, obtained from the rate of error induced by $2w^2/n$ and from the correction capacity of C;
- security corresponds to the security of the parameter; and
- complexity corresponds to the binary number necessary to run the method from one side.

These parameters are selected so that $n2^{2w-r} = 2^{80}$.

| n | w | t | sb | code C | ϵ | complexity | security |
|---|---|---|----|--------|---|------------|----------|
| 4451 | 33 | 150 | 78 | BCH (127, 51) ⊗ $1_{35}$ | $3 \cdot 10^{-5}$ | $2^{17}$ | $2^{78}$ |
| 4877 | 33 | 150 | 131 | BCH (255, 37) ⊗ $1_{19}$ | $13 \cdot 10^{-2}$ | $2^{17}$ | $2^{78}$ |
| 4877 | 34 | 150 | 91 | BCH (255, 51) ⊗ $1_{19}$ | $23 \cdot 10^{-5}$ | $2^{17}$ | $2^{80}$ |
| 5387 | 34 | 150 | 131 | BCH (255, 37) ⊗ $1_{23}$ | $33 \cdot 10^{-5}$ | $2^{17}$ | $2^{80}$ |
| 5387 | 34 | 150 | 91 | BCH (255, 51) ⊗ $1_{23}$ | $23 \cdot 10^{-10}$ | $2^{17}$ | $2^{80}$ |
| 5869 | 34 | 150 | 131 | BCH (255, 51) ⊗ $1_{23}$ | $33 \cdot 10^{-10}$ | $2^{18}$ | $2^{80}$ |
| 7829 | 44 | 150 | 131 | BCH (255, 37) ⊗ $1_{34}$ | $43 \cdot 10^{-7}$ | $2^{19}$ | $2^{100}$ |
| 11483 | 58 | 150 | 131 | BCH (255, 37) ⊗ $1_{43}$ | $73 \cdot 10^{-7}$ | $2^{20}$ | $2^{130}$ |

It is well to stress that, according to a third embodiment, the reconciliation step can introduce a noise-added message $M_{2B}(C)$ such that the data item C comprises simultaneously a truncation operation on the second intermediate value $P_B$ and a random error vector.

Figure 3:
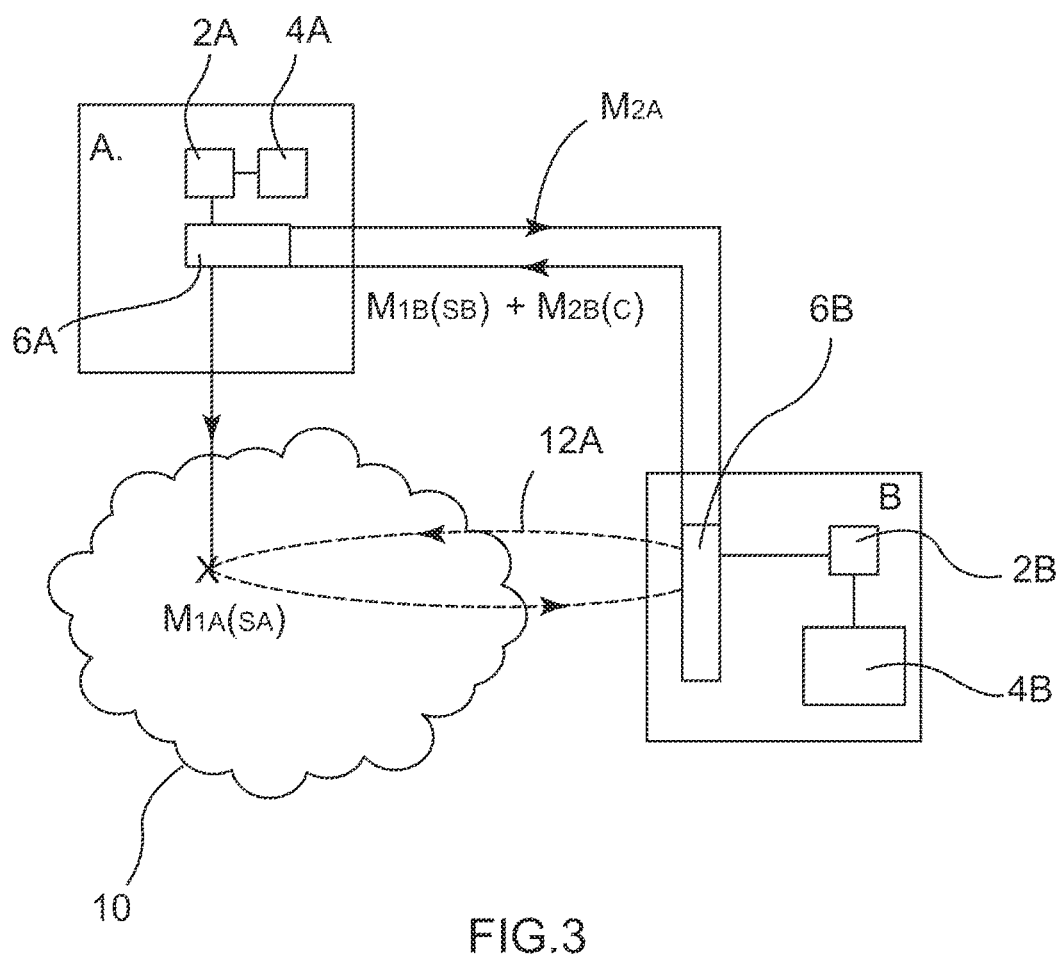
FIG. 3 is a diagrammatic representation of a third embodiment of the cryptographic method according to the invention, by which a first entity authenticates itself with regard to a second entity.

FIG. 3 illustrates a third example of embodiment in which the process according to the invention is used to perform an authentication protocol.

This third example of embodiment functions in the same way as the second example of embodiment. At the end of the method as described previously, Alice resends the confidential information m to Bob so as to guarantee that Alice indeed possesses the private key corresponding to the two primary elements $X_A$, $Y_A$ that are associated with the public key corresponding to the syndrome $S_A$.

The invention claimed is:

1. A method for communicating confidential information m between a first electronic entity (A) and a second electronic entity (B) comprising a distribution phase followed by a reconciliation phase, the distribution phase comprising:
at the first electronic entity:
computing a first syndrome $S_A = X_A + f(Y_A)$ from a first secret piece of information composed of two primary elements $X_A$ and $Y_A$ belonging to a ring R and exhibiting a norm that is essentially small with regard to an element $f(X_A)$ or $f(Y_A)$,
wherein the ring R possesses the addition and the multiplication, and wherein f is a law of internal composition that associates with any element $X_I$ of the ring R another element $f(X_I)$ of the ring R, and that possesses the property that for any pair of elements $X_I$ and $Y_I$ of R, such that $X_I$ and $Y_I$ have a small norm with regard to the elements $f(X_I)$ and $f(Y_I)$, then $X_I \cdot f(Y_I) - Y_I \cdot f(X_I)$ is of small norm, and issuing a first message composed from the first syndrome $S_A$ so that said first syndrome $S_A$ is accessible by the second electronic entity (B), at the second entity (B):
computing a second syndrome $S_B = X_B + f(Y_B)$ from a second secret piece of information composed of two secondary elements $X_B$ and $Y_B$ belonging to the ring R and exhibiting a norm that is essentially small with regard to an element $f(X_B)$ or $f(Y_B)$, and transmitting to the first electronic entity (A) a second message composed from the second syndrome $S_B$ so that said second syndrome $S_B$ is accessible by the first electronic entity (A), at the first electronic entity (A),
determining the second syndrome $S_B$ from the second message, and
computing a first intermediate value $P_A$ such that: $P_A = Y_A \cdot S_B = Y_A \cdot X_B + Y_A \cdot f(Y_B)$, and at the second electronic entity (B),
obtaining the first message issued by the first electronic entity,
determining the first syndrome $S_A$ from the first message, and
computing a second intermediate value $P_B$ such that: $P_B = Y_B \cdot S_A = Y_B \cdot X_A + Y_B \cdot f(Y_A)$, the reconciliation phase comprising, at the first electronic entity (A) determining the confidential information by an operation of deciphering a noise-added message composed by the second electronic entity (B) from the second intermediate value $P_B$, wherein the ring R is the ring $F_q[x]/(X^n-1)$ that is the set of polynomials with coefficients in the field $F_q$ with q elements for which the remainder is considered by the division of the polynomial $(X^n-1)$, with n equal to 6000, and $X_A$, $X_B$, $Y_A$, $Y_B$ exhibit a norm equal to 35, or the ring R is the ring Z/pZ that is the set of the modulo integers p minus the remainder of the division by p, with p equal to 2500, $f(x) = h \cdot x$ modulo p with h a random number smaller than p, and/or $X_A$, $X_B$, $Y_A$, $Y_B$ are R elements of smaller norm than root (p).

2. The method according to claim 1, further comprising, at the first entity (A), transmitting the first message to the second entity (B).

3. The method according to claim 2, wherein the noise-added message composed by the second entity (B) during the reconciliation phase comprises a data item C obtained from the second intermediate value $P_B$ and the confidential information m.

4. The method according to claim 3, further comprising decoding, at the first electronic entity (A), the confidential information m from the noise-added message and the first intermediate value $P_A$.

5. The method according to claim 4, wherein the confidential information m is encoded in the data item C of the noise-added message, by an error-correcting code.

6. The method according to claim 5, wherein the data item C of the noise-added message is such that $C = m \cdot G + P_B + e$, wherein:
m represents the confidential information,
G represents a generator matrix of an error-correcting code on which the first electronic entity (A) and the second electronic entity (B) have previously publicly agreed, and
e which represents a vector of random errors of length n, the first electronic entity (A) and the second electronic entity (B) having previously publicly agreed on the length n.

7. The method according to claim 5, wherein the data item C of the noise-added message is such that $C = m \cdot G + v[P_B]$, wherein:
m represents the confidential information,
G represents a generator matrix of an error-correcting code on which the first electronic entity (A) and the second electronic entity (B) have previously publicly agreed, and
v represents an operation consisting in extracting p coordinates from the n coordinates of a vector, the first electronic entity (A) and the second electronic entity (B) having previously agreed on the value of p.

8. The method according to claim 5, wherein the data item C of the noise-added message is such that $C = m \cdot G + v[P_B] + e$, wherein:
m represents the confidential information,
G represents a generator matrix of an error-correcting code on which the first electronic entity (A) and the second electronic entity (B) have previously publicly agreed,
v represents an operation consisting in extracting p coordinates from the n coordinates of a vector, the first electronic entity (A) and the second electronic entity (B) having previously agreed on the value of p,
e represents a vector of random errors of length n, the first electronic entity (A) and the second electronic entity (B) having previously publicly agreed on the length n.

9. The method according to claim 1, wherein the first electronic entity (A) composes an encryption key either from the confidential information m, or from the second intermediate value $P_B$, or from a combination of the confidential information and the second intermediate value $P_B$.

10. The method according to claim 1, further comprising, at the first electronic entity (A), making the first message available to the second electronic entity (B) in a public space that is accessible to at least one other electronic entity.

11. The method according to claim 10, further comprising, at the second electronic entity (B), transmitting to the first electronic entity (A):
the noise-added message composed from a data item C obtained from the second intermediate value $P_B$ and the confidential information m.

12. The method according to claim 11, wherein the first electronic entity (A) decodes the confidential information from the second message and from the noise-added message.

13. The method according to claim 11, wherein the first electronic entity (A) decodes the confidential information m from the second syndrome $S_B$ that composes the second message, from the second intermediate value $P_B$ that composes the noise-added message, and from the first intermediate value $P_A$.

14. The method according to claim 11, wherein the confidential information m is encoded in the data item C of the noise-added message, by an error-correcting code.

15. The method according to claim 14, wherein the data item C of the noise-added message is such that $C = m \cdot G + P_B + e$, wherein:
m represents the confidential information, G represents a generator matrix of an error-correcting code on which the first electronic entity (A) and the second electronic entity (B) have previously publicly agreed, and e represents a vector of random errors of length n, the first electronic entity (A) and the second electronic entity (B) having previously publicly agreed on the length n.

16. The method according to claim 14, wherein the data item C of the noise-added message is such that C=m·G+v[$P_B$], wherein:

m represents the confidential information,

G represents a generator matrix of an error-correcting code on which the first electronic entity (A) and the second electronic entity (B) have previously publicly agreed, and v represents an operation consisting in extracting p coordinates from the n coordinates of a vector, the first electronic entity (A) and the second electronic entity (B) having previously agreed on the value of p.

17. The method according to claim 14, wherein the data item C of the noise-added message is such that C=m·G+v[$P_B$]+e, wherein:

m represents the confidential information,

G represents a generator matrix of an error-correcting code on which the first electronic entity (A) and the second electronic entity (B) have previously publicly agreed, v represents an operation consisting in extracting p coordinates from the n coordinates of a vector, the first electronic entity (A) and the second electronic entity (B) having previously agreed on the value of p, e represents a vector of random errors of length n, the first electronic entity (A) and the second electronic entity (B) having previously publicly agreed on the length n.

18. The method according to claim 9, wherein the first electronic entity (A) composes an authentication message either from the confidential information m, or from the second intermediate value $P_B$, or from a combination of the confidential information m and the second intermediate value $P_B$.

19. The method according to claim 1, wherein the norm corresponds to the Hamming distance.

20. The method according to claim 1, wherein the norm is a Euclidean norm.

21. A cryptographic device comprising:

a processor;

a storage space; and a communication unit configured to:

compute a first syndrome $S_A=X_A+f(Y_A)$ from a first secret piece of information composed of two primary elements $X_A$ and $Y_A$ belonging to a ring R and exhibiting a norm that is essentially small with regard to an element $f(X_A)$ or $f(Y_A)$, wherein the ring R possesses the addition and the multiplication, and f is a law of internal composition that associates with any element $X_I$ of the ring R another element $f(X_I)$ of the ring R, and that possesses the property that for any pair of elements $X_I$ and $Y_I$ of R, such that $X_I$ and $Y_I$ have a small norm with regard to the elements $f(X_I)$ and $f(Y_I)$, then $X_I·f(Y_I)-Y_I·f(X_I)$ is of small norm, issue a first message composed from the first syndrome $S_A$, receive a second message composed from a second syndrome $S_B=X_B+f(Y_B)$ computed from a second secret piece of information composed of two secondary elements $X_B$ and $Y_B$ belonging to the ring R and exhibiting a norm that is essentially small with regard to an element $f(X_B)$ or $f(Y_B)$, determine the second syndrome $S_B$ from the second message and compute a first intermediate value $P_A$ such that: $P_A=Y_A·S_B=Y_A·X_B+Y_A·f(Y_B)$, obtain a noise-added message composed from a second intermediate value $P_B$, such that: $P_B=Y_B·S_A=Y_B·X_A+Y_B·f(Y_A)$, and determine confidential information by an operation of deciphering the noise-added message, wherein the ring R is the ring $F_q[x]/(X^n-1)$ that is the set of polynomials with coefficients in the field $F_q$ with q elements for which the remainder is considered by the division of the polynomial $(X^n-1)$, with n equal to 6000, and $X_A$, $X_B$, $Y_A$, $Y_B$ exhibit a norm equal to 35, or the ring R is the ring Z/pZ that is the set of the modulo integers p minus the remainder of the division by p, with p equal to 2500, f(x)=h·x modulo p with h a random number smaller than p, and/or $X_A$, $X_B$, $Y_A$, $Y_B$ are R elements of smaller norm than root (p).

* * * * *